(12) United States Patent
Utagawa (10) Patent No.: US 7,767,946 B2
(45) Date of Patent: Aug. 3, 2010

(54) FOCUS DETECTION DEVICE AND IMAGE PICK-UP DEVICE

(75) Inventor: Ken Utagawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/155,737

(22) Filed: Jun. 9, 2008

(65) Prior Publication Data

US 2008/0302947 A1 Dec. 11, 2008

Related U.S. Application Data

(60) Provisional application No. 61/064,314, filed on Feb. 27, 2008.

(30) Foreign Application Priority Data

Jun. 11, 2007 (JP) ............................. 2007-153486

(51) Int. Cl.
*G02B 7/04* (2006.01)
*G02B 27/40* (2006.01)
*G02B 27/64* (2006.01)

(52) U.S. Cl. ................. 250/201.2; 250/208.1; 382/255; 396/121; 396/122

(58) Field of Classification Search ............... 250/201.2, 250/201.8, 208.2; 382/255; 396/121, 122
See application file for complete search history.

(56) References Cited

U.S. PATENT DOCUMENTS 4,346,970 A    8/1982  Kawabata et al.
6,750,437 B2 *  6/2004  Yamashita et al. ........ 250/208.1
6,781,632 B1 *  8/2004  Ide ............................. 348/345
6,933,978 B1 *  8/2005  Suda .......................... 348/345
7,041,950 B2 *  5/2006  Nagano .................... 250/201.2
2006/0132628 A1 * 6/2006  Suzuki ........................ 348/272
2007/0102619 A1 * 5/2007  Kusaka .................... 250/201.2

FOREIGN PATENT DOCUMENTS

JP      A-2-123313      5/1990
JP      A-3-164709      7/1991

* cited by examiner

*Primary Examiner*—Thanh X Luu
*Assistant Examiner*—Francis M Legasse, Jr.
(74) *Attorney, Agent, or Firm*—Oliff & Berridge, PLC (57) ABSTRACT

A focus detection device includes a micro lens array having a plurality of micro lenses, a light receiving element array having a plurality of light receiving elements for each micro lens and that receives light rays from a plurality of partial areas in which pupils of an imaging optical system are different from each other, in a plurality of light receiving elements respectively through each micro lens and a focus detection calculation circuit. The device generates at least three signal strings respectively corresponding to images of light rays which have been transmitted through at least three of the partial areas, based on signals output from the plurality of light receiving elements of the light receiving element array. The device obtains, from the at least three signal strings, shift amounts of two signal strings corresponding to two partial areas, and detects a focus adjustment state of an imaging optical system based on the obtained plurality of shifts amounts.

17 Claims, 7 Drawing Sheets

| (1.1) | (1.2) | (1.3) | (1.4) | (1.5) | (1.6) |
|---|---|---|---|---|---|
| (2.1) | (2.2) | (2.3) | (2.4) | (2.5) | (2.6) |
| (3.1) | (3.2) | (3.3) | (3.4) | (3.5) | (3.6) |
| (4.1) | (4.2) | (4.3) | (4.4) | (4.5) | (4.6) |
| (5.1) | (5.2) | (5.3) | (5.4) | (5.5) | (5.6) |
| (6.1) | (6.2) | (6.3) | (6.4) | (6.5) | (6.6) |

FOCUS DETECTION DEVICE AND IMAGE PICK-UP DEVICE

INCORPORATION BY REFERENCE

This non-provisional application claims the benefit of U.S. Provisional Application No. 61/064,314, filed Feb. 27, 2008, the disclosure of which is incorporated herein by reference in its entirety. The disclosure of the following priority application is herein incorporated by reference in its entirety: Japanese Application No. 2007-153486 filed in Japan on Jun. 11, 2007.

BACKGROUND

This invention relates to a focus detection device and an image pick-up device.

A focus detection device is known in which a pupil of a shooting optical system is divided by a plurality of pairs of re-imaging lenses whose intervals (between-axis distance) of apertures of pairs of re-imaging lenses are different, relative image shift amounts are respectively calculated for a plurality of pairs of images formed by light beams whose pupils have been divided, and a true defocus amount is obtained by eliminating a false focus from a plurality of defocus amounts. See, for example, Japanese Patent No. 2910102.

SUMMARY

However, focus detection accuracy is not sufficient in the above-mentioned conventional focus detection device.

A focus detection device according to one aspect of the invention includes a micro lens array in which a plurality of micro lenses are arranged. The device also includes a light receiving element array which has a plurality of light receiving elements for each of the micro lenses and receives, by the respective plurality of light receiving elements via the respective micro lenses, a light beam from a plurality of partial areas, in which pupils of an imaging optical system are different from each other. The device also includes a signal string generator which generates at least three signal strings respectively corresponding to images of light beams which have been transmitted through at least three of the partial areas, based on signals output from the plurality of light receiving elements of the light receiving element array. The device also includes a focus detector which obtains, within the at least three signal strings, shift amounts of two of the signal strings corresponding to two of the partial areas, for a plurality of groups of the partial areas, and detects a focus adjustment state of the imaging optical system based on the obtained plurality of shift amounts.

In accordance with some embodiments, the two signal strings are signal strings corresponding to partial areas adjacent to each other within the plurality of partial areas.

In accordance with some embodiments, the plurality of shift amounts include a shift amount between a first signal string corresponding to a first partial area within the plurality of partial areas and a second signal string corresponding to a second partial area different from the first partial area, and a shift amount between the first signal string and a third signal string corresponding to a third partial area different from the first and second partial areas.

In accordance with some embodiments, the focus detector calculates the focus adjustment state by weighted addition of the respective ones of the plurality of shift amounts.

In accordance with some embodiments, the focus detector multiplies and adds separate conversion coefficients of the shift amounts for two of the respective signal strings corresponding to the two partial areas, and calculates a defocus amount of the imaging optical system.

In accordance with some embodiments, the conversion coefficients are set according to the position of the light receiving elements of the light receiving element array.

In accordance with some embodiments, the signal string generator generates a plurality of signal strings based on light beams which have been transmitted through at least three partial areas included in an area corresponding to an aperture stop in which the imaging optical system is restricted.

In accordance with some embodiments, the signal string generator generates the plurality of signal strings by adding outputs of a plurality of light receiving elements within the plurality of light receiving elements of the light receiving element array.

In accordance with some embodiments, the plurality of light receiving elements are one-dimensionally arranged.

In accordance with some embodiments, the plurality of light receiving elements are two-dimensionally arranged.

According to some embodiments, an image pick-up device can include the focus detection device.

According to aspects of the invention, an accurate defocus amount can be detected by eliminating a false focus with respect an object having a cyclic pattern.

DETAILED DESCRIPTION OF EMBODIMENTS

An embodiment is explained, in which the invention is applied to a single lens reflex digital camera. The invention is not limited to a single lens reflex digital camera, but also can be applied to all types of optical devices (for example, a field scope, etc.) which perform focus adjustment of an imaging optical system.

Figure 1:
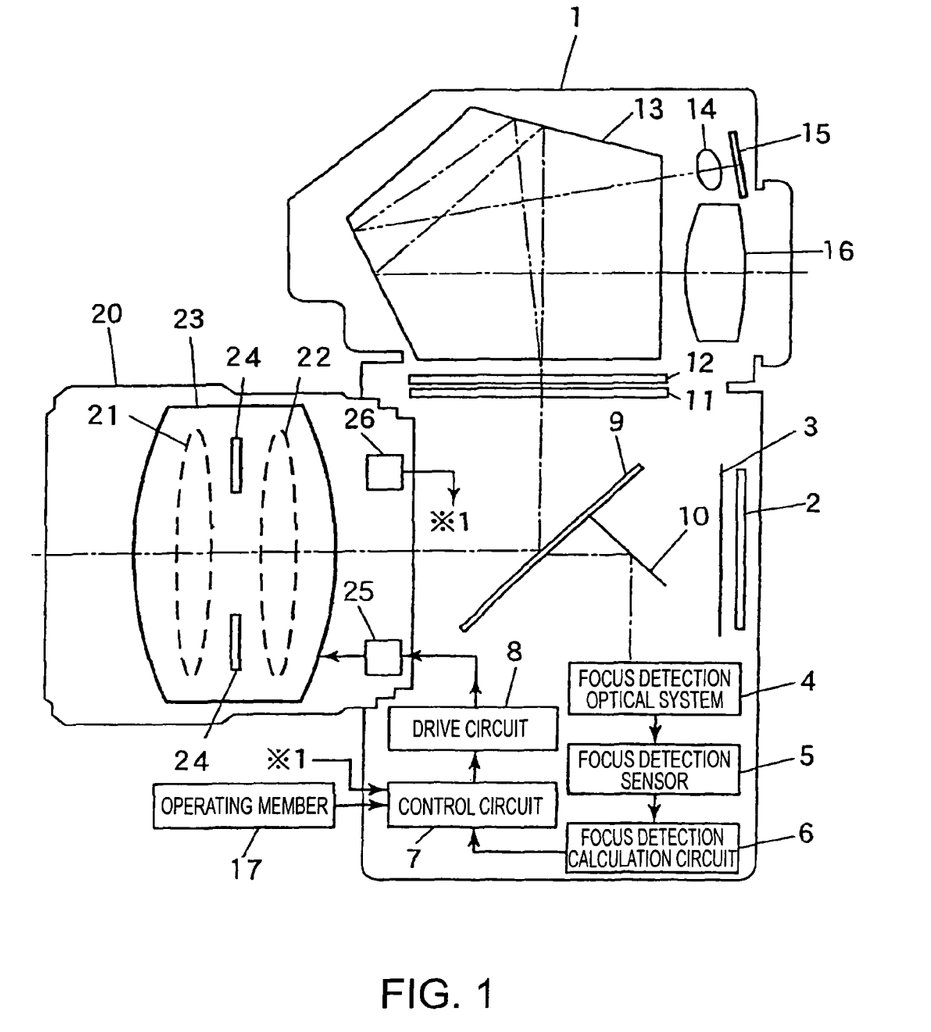
FIG. 1 is a cross-sectional schematic view showing a structure of a digital single lens reflex camera provided with a focus detection device of an embodiment of the invention.

FIG. 1 is a cross-sectional schematic view showing a structure of a digital single lens reflex camera provided with a focus detection device of an embodiment of the invention. Drawings and descriptions of general equipment and devices of a camera, other than equipment and devices related to a focus detection device and an image pick-up device of this invention, are omitted from the drawings to simplify the description. With respect to a camera of an embodiment, a lens barrel 20 is mounted to a camera body 1, and the lens barrel 20 can be replaced with all types of shooting lenses.

Furthermore, in this embodiment, an explanation is given by using an example of replaceable lens type camera; however, the invention is not limited to a replaceable lens type camera, but also can be applied to a fixed lens type camera.

The camera body 1 is provided with an image pick-up element 2, a shutter 3, a focus detection optical system 4, a focus detection sensor 5, a focus detection calculation circuit 6, a camera control circuit 7, a drive circuit 8, a quick return mirror 9, a sub mirror 10, a viewfinder screen 11, a transparent type liquid crystal display 12, a pentaprism 13, a light measurement lens 14, a light measurement sensor 15, an eyepiece 16, an operating member 17, etc.

The image pick-up element 2 can include a CCD, a CMOS, etc. and converts an object image, imaged onto a surface of the pick-up element 2 by an image pick-up lens 23 within the lens barrel 20, into an electrical signal and outputs the electrical signal. The shutter 3 is released only for a shutter time that is based on an exposure calculation result or manually set by an operator, when a shutter button (undepicted) is completely pressed (when a shutter is released), and the image pick-up element 2 is exposed. The focus detection optical system 4, the focus detection sensor 5, and the focus detection calculation circuit 6 constitute a phase difference detection type focus detection device that detects a defocus amount showing a focus adjustment state of the shooting lens (imaging optical system) 23. Details of the focus detection device will be described hereafter.

The camera control circuit 7 includes undepicted peripheral parts such as a microcomputer and a memory and performs sequential control of light measurement, focus detection, shooting and the like, and calculation control such as exposure calculation. The drive circuit 8 drivingly controls a lens and stop driving actuator 25 arranged within the lens barrel 20. The light measurement sensor 15 outputs a light measurement signal corresponding to brightness of the respective areas by dividing a shooting screen into a plurality of areas.

The lens barrel 20 is provided with a zooming lens 21, a focusing lens 22, a stop (or diaphragm) 24, the lens and stop driving actuator 25, a lens memory 26, etc. In FIG. 1, the zooming lens 21 and the focusing lens 22 are collectively shown as one shooting lens 23; however, separate optical elements can be provided. The zooming lens 21 is driven by the actuator 25 in an optical axis direction and is a lens which changes a focal length of the shooting lens 23. Furthermore, the focusing lens 22 is driven by the actuator 25 in an optical axis direction and is a lens which performs focus adjustment of the shooting lens 23. The stop 24 is driven by the actuator 25 and changes an aperture stop diameter. In the lens memory 26, information is stored concerning the lens barrel 20 and the shooting lens 23, such as an aperture F value of the shooting lens 23, a pupil length PO, and a focal length.

The operating member 17, which is operated by an operator, can include a plurality of user-operatable buttons, switches, etc, arranged on the camera body 1 and the lens barrel 20. The operating member 17 includes a release half-press switch which is turned on when the shutter button is halfway pressed, a release full-press switch which is turned on when the shutter button is completely pressed, etc.

Other than at the shooting time, the quick return mirror 9 and the sub mirror 10 are placed within a shooting optical path as shown in FIG. 1. At this time, part of the light from the object which has been transmitted through the shooting lens 23 is reflected by the quick return mirror 9 and is guided to the viewfinder screen 11. An object image is imaged onto the screen 11. The transparent type liquid crystal display 12 overlaps and displays a focus detection area mark on an object image of the screen 11 and also displays, outside of the object, image information concerning shooting, such as a shutter speed, a stop value, number of shooting frames, and the like.

An object image on the screen 11 is guided to the eyes of an operator through the pentaprism 13 and the eyepiece lens 16 and also is guided to the light measurement sensor 15 via the pentaprism 13 and the light measurement lens 14. The camera control circuit 7 performs exposure calculation based on a light measurement signal for each light measurement area to be output from the light measurement sensor 15 and calculates a shutter speed and a stop value corresponding to brightness of the subject field. Additionally, when a manual exposure shooting mode is set, a set shutter speed and stop value are used that are set by an operator by operating the operating member 17.

Meanwhile, another part of the light from the object which has been transmitted through the shooting lens 23 is transmitted through the quick return mirror 9, is reflected by the sub mirror 10, and is guided to the focus detection sensor 5 through the focus detection optical system 4. In this embodiment, focus detection areas are set in a plurality of positions within a shooting screen. The focus detection sensor 5 outputs a focus detection signal representing a focus adjustment state of the shooting lens 23 for each focus detection area. The focus detection calculation circuit 6 calculates a defocus amount representing a focus adjustment state of the shooting lens 23, based on the focus detection signal for each focus detection area. The camera control circuit 7 calculates a lens drive amount based on the defocus amount, drives the actuator 25 by the drive circuit 8, and drives the focusing lens 22 to a focused position.

During shooting, the quick return mirror 9 and the sub mirror 10 are shielded from the shooting optical path (the mirrors move up), light beams from the object which have been transmitted through the shooting lens 23 are guided while the shutter 3 is open, and an object image that is imaged on an image pick-up surface of the image pick-up element 2 is captured.

Figure 2:
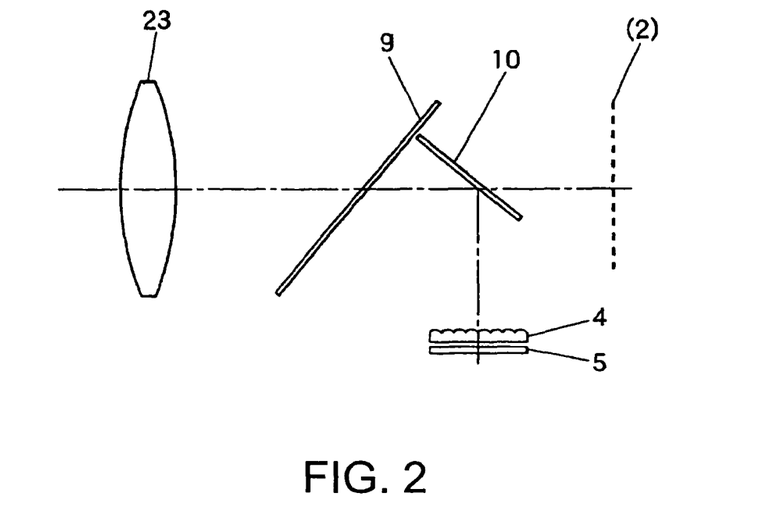
FIG. 2 is a diagram showing details of a focus detection optical system and a focus detection sensor.
Figure 3:
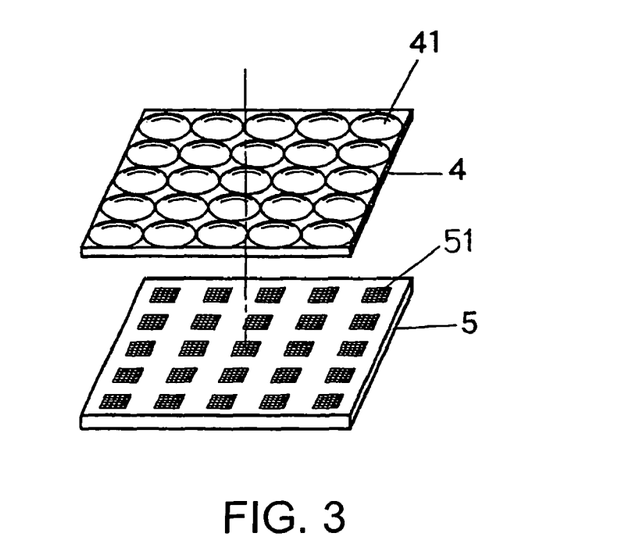
FIG. 3 is a diagram showing details of a focus detection optical system and a focus detection sensor.

FIGS. 2 and 3 are diagrams showing details of the focus detection optical system 4 and the focus detection sensor 5. In the diagrams, the focus detection optical system 4 is a micro lens array in which a plurality of micro lenses 41 are two-dimensionally arranged. The micro lens array is arranged in a vicinity of a plane that matches a focal plane of the shooting lens 23, that is, a plane conjugate to an image pick-up surface of the image pick-up element 2. FIGS. 2 and 3 show only a few (25) micro lenses; however, it is preferable that many more micro lenses are arranged at a pitch of 100 microns or less. Thus, if the micro lens array provides a width within a range of, for example, 5 mm square, the number of micro lenses becomes extremely large.

The focus detection sensor 5 is a light receiving element array 51 in which a plurality of light receiving elements (photoelectric conversion elements) are two-dimensionally arranged. The array 51 is arranged in the back of the focus detection optical system (micro lens array) 4. Additionally, in FIG. 3, in order to simplify the explanation, the light receiving element array 51 includes, for each micro lens 41 in the micro lens array, an array of light receiving elements disposed in six rows and six columns, for a total of 36 light receiving elements for each of the micro lenses 41, arranged in a square shape. However, the number of light receiving elements for each micro lens is not limited to the number of this embodiment. Additionally, instead of arranging a distinct group of light receiving elements for each micro lens, a single large group of light receiving elements, arranged as a two-dimensional light receiving element array, can span across all of the lenses 41 in the array.

Light rays (beams) from the object are transmitted through the quick return mirror 9, are reflected by the sub mirror 10, and are guided to the focus detection sensor (light receiving element array) 5 via the focus detection optical system (micro lens array) 4.

Figure 4:
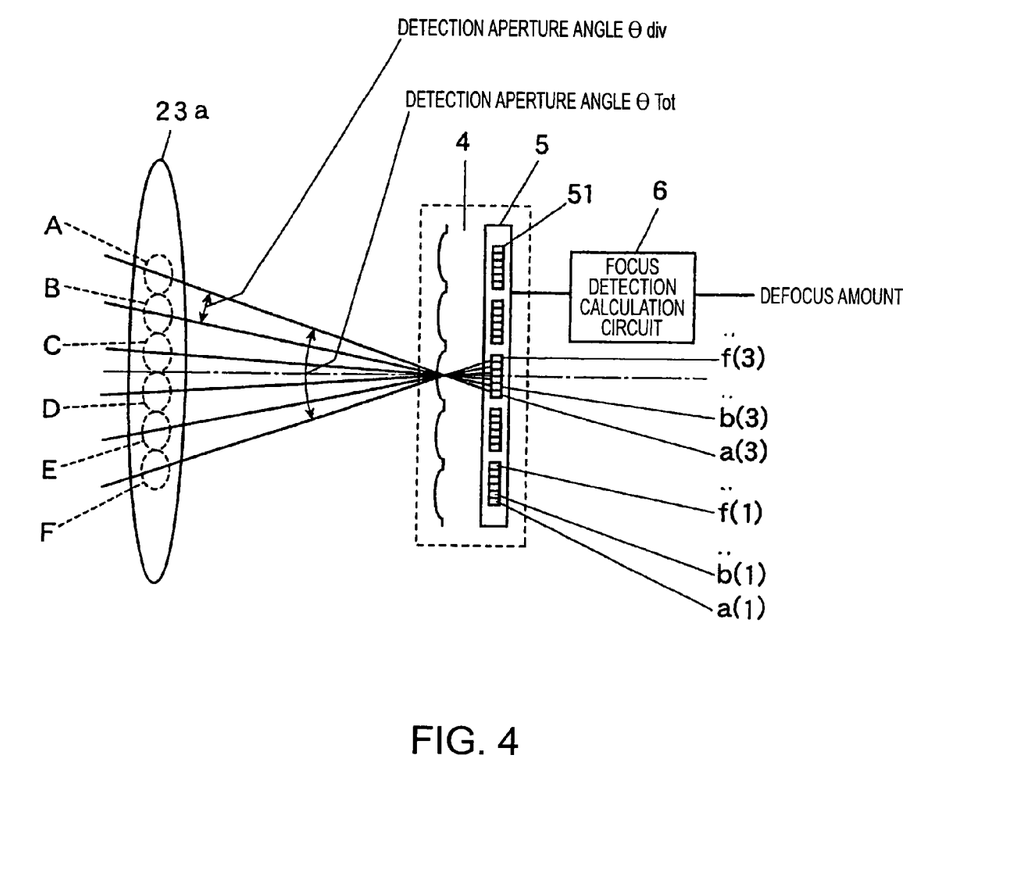
FIG. 4 is a diagram showing the relationship between a plurality of light receiving element arrays of a focus detection sensor and partial pupils on an exit pupil of a shooting lens.

FIG. 4 is a diagram showing a relationship between the plurality of light receiving element arrays 51 of the focus detection sensor 5 and partial pupils A-F on an exit pupil 23*a* of the shooting lens 23. The respective light receiving element arrays 51 under each micro lens 41 are shot onto the partial pupils A-F on the exit pupil 23*a* by each micro lens 41. The light rays which have been transmitted through the respective partial pupils A-F on the exit pupil 23*a* are guided to each light receiving element array 51 through the respective micro lenses 41, and each light receiving element array 51 photoelectrically converts its received light.

In FIG. 4, in order to reduce a frequency of generating a false focus by a cyclic pattern, an image shift amount should be reduced. Therefore, a detection aperture angle needs to be made small, but as the detection aperture angle is made smaller, detection accuracy of a defocus amount deteriorates. Thus, in this embodiment, an entire detection aperture angle θTot is divided according to the partial pupils A-F, an image shift amount is obtained and totaled for each detection aperture angle θdiv, which results from the entire detection aperture angle θTot having been divided into small angles. The total image shift amount corresponding to the entire detection aperture angle θTot, that is, partial pupils A and F at both ends, is converted to a defocus amount. As described above, in a pupil division type phase difference detection type focus detection which performs pupil division by using a re-imaging lens, a detection aperture angle cannot be made sufficiently small. However, according to the pupil division type phase difference detection type focus detection of this embodiment, which performs pupil division by using a micro lens array, by reducing a detection aperture angle of adjacent division pupils, many divided pupils can be aligned. By so doing, a false focus cannot be easily generated with respect to an object having a cyclic pattern, and an accurate defocus amount can be detected. Detection accuracy of the defocus amount can be improved. Additionally, the respective image shifts in many divided-pupil pairs are obtained, a statistical average such as weighted addition is performed over many image shifts, and a defocus amount is obtained. Thus, various error elements are canceled, and detection accuracy is improved.

Figure 5:
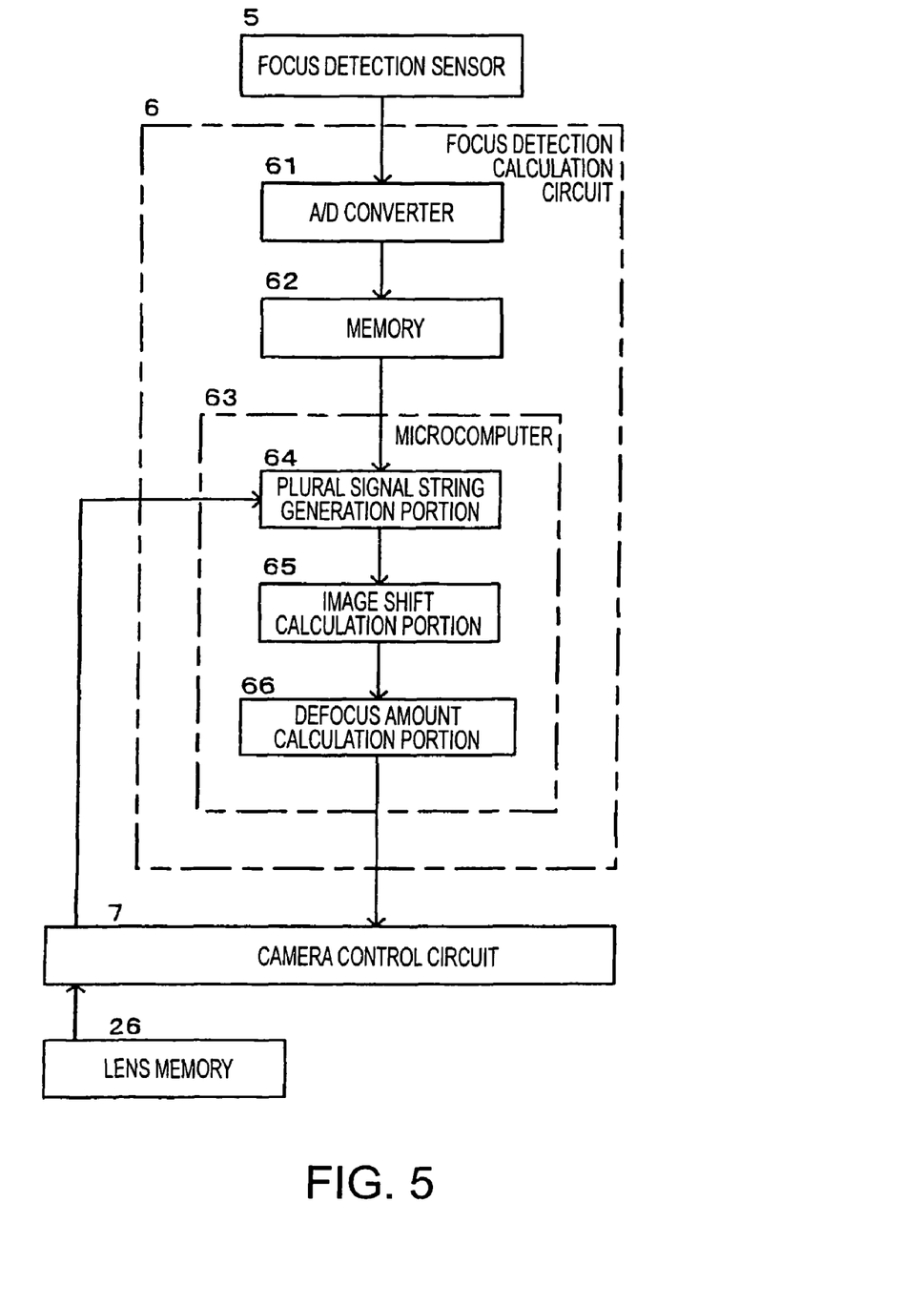
FIG. 5 is a diagram showing a detailed structure of a focus detection calculation circuit.

FIG. 5 is a diagram showing a detailed structure of the focus detection calculation circuit 6. The focus detection calculation circuit 6 is provided with an A/D converter 61, a memory 62, a microcomputer 63, etc. and includes a plural signal string generation portion 64, an image shift calculation portion 65, and a defocus amount calculation portion 66, which are implemented by software of the microcomputer 63. After the output of the plurality of light receiving element arrays 51 of the focus detection sensor 5 is sequentially read and converted to a digital signal by the A/D converter 61, it is stored in the memory 62.

The plural signal string generation portion 64 obtains pupil information (aperture F value, pupil distance PO, etc.) of the shooting lens 23 and the lens barrel 20 from the lens memory 26 via the camera control circuit 7, obtains a stop control F value at the time of shooting from the camera control circuit 7, specifies a range of partial pupils which can be used for calculation of an image shift amount based on the information, and generates signal strings with respect to the partial pupils.

Figure 6:
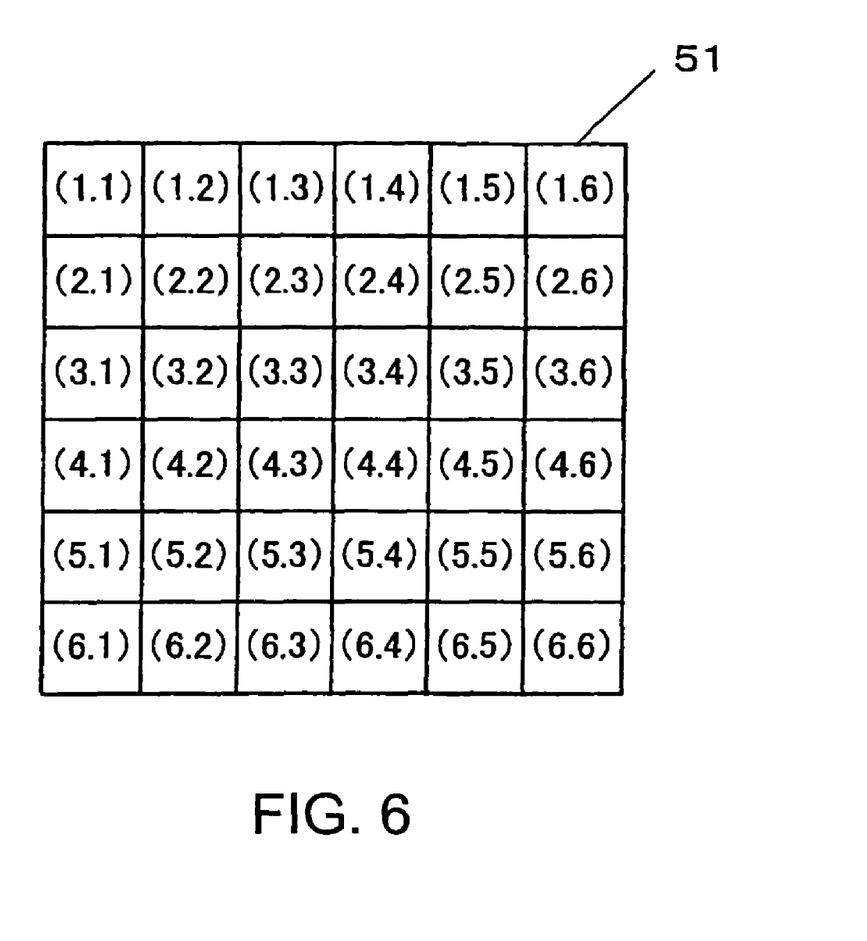
FIG. 6 is an enlarged view of a light receiving element array under a micro lens.

FIG. 6 is an enlarged view of the light receiving element array 51 under each micro lens 41. According to this embodiment, in order to simplify the explanation, an example of the light receiving element array 51 (six rows by six columns) is used. As shown in FIG. 6, each light receiving element has an address for classification. Here, a signal string is generated by using only the third line showing light receiving elements (3.1)-(3.6) of each light receiving element array 51. For example, output signals a(1), b(1), . . . , f(1) of the light receiving element array 51 which is at the bottom of FIG. 4 correspond to output signals of (3.1), (3.2), . . . , (3.6) of the third line shown in FIG. 6. In the same manner, the output signals of the other light receiving element arrays 51 correspond to output signals of light receiving elements (3.1), (3.2), . . . , (3.6) of the third line of the light receiving element array 51.

Within the light receiving elements of the third line of each light receiving element array 51, a signal string {a(i)} can be shown as follows in which only output signals of light receiving elements receiving light rays which have been transmitted through the partial pupil are aligned:

$$\{a(i)\}=a(1), a(2), a(3), \ldots, a(n) \qquad (1).$$

This signal string {a(i)} shows that the output signals of the light receiving element (3.1) of each light receiving element array 51 are aligned in the order of the light receiving element array 51. In the same manner, within the light receiving element of the third line of each light receiving element array 51, a signal string which aligns only the output signals of the light receiving elements receiving light rays that have been transmitted through the respective partial pupils B, C, D, E, and F is defined as {b(i)}, {c(i)}, {d(i)}, {e(i)}, {f(i)}. According to the above-mentioned (1), these are shown. The signal string {b(i)} shows that the output signals of the light receiving element (3.2) of each light receiving element array 51 are sequentially aligned in the order of the light receiving element array 51. The signal string {c(i)} shows that the output signals of the light receiving element (3.3) of each light receiving element array 51 are sequentially aligned in the order of the light receiving element array 51. The signal string {d(i)} shows that the output signals of the light receiving element (3.4) of each light receiving element array 51 are sequentially aligned in the order of the light receiving element array 51. Furthermore, the signal string {e(i)} shows that the output signals of the light receiving element (3.5) of each light receiving element array 51 are sequentially aligned in the order of the light receiving element array 51. The signal string {f(i)} shows that the output signals of the light receiving element (3.6) of each light receiving element array 51 are sequentially aligned in the order of the light receiving element array 51.

Figure 9:
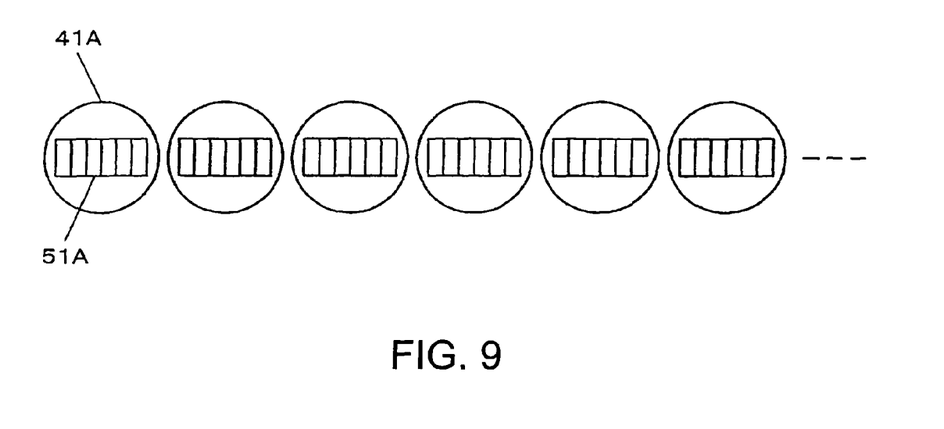
FIG. 9 is a diagram showing a micro lens array and a light receiving element array of a modified example.

Furthermore, if a signal string is thus generated by using only the output signal of the light receiving elements of the third line of each light receiving element array 51, it is not necessary to two-dimensionally arrange a plurality of light receiving elements under each micro lens. For example, as shown in FIG. 9, a one-dimensional light receiving element array 51A can be used, which aligns six light receiving elements under each micro lens 41*a*.

With respect to the image shift calculation portion 65, within the signal string generated by the plural signal string generation portion 64, the signal string in which the partial pupils are adjacent to each other is considered as one pair, and a correlation amount C (M) of each pair of signal strings is calculated by the following equation. For example, a correlation amount C (N)_ab of a pair of signal strings {a(i)} and {b(i)} corresponding to the adjacent partial pupils A and B is $$C(N)\_ab = \Sigma |a(i) - b(j)| \quad (2).$$

According to equation (2), N represents a shift amount which is j−i=N, and is a total sum of Σ, in which an upper limit is qL, and a lower limit is pL. An accurate shift amount can be obtained as follows based on the correlation amount C (N) which has been thus discretely obtained. Within the correlation amount C (N), C0 is a correlation amount giving a minimum value when the shift amount is N, Cr is a correlation amount when a shift amount is (N−1), and Cf is a correlation amount when a shift amount is (N+1). An accurate shift amount based on the aligned three points, that is, a shift amount N x_ab can be determined by the following equation:

$$DL = 0.5 \, X(Cr - Cf),$$

$$E = \text{MAX} \{Cf - C0, Cr - C0\},$$

$$Nx\_ab = N + DL/E \quad (3).$$

In the same manner, based on the signal strings {b(i)} and {c(i)}, {c(i)} and {d(i)}, {d(i)} and {e(i)}, {e(i)} and {f(i)} of adjacent partial pupils within the partial pupils B-F, shift amounts N x_bc, N x_cd, N x_de, N x_ef are calculated for each detection aperture angle θdiv divided by the partial pupils B-F (see FIG. 4). In FIG. 4, the entire detection aperture angle θTot is a total sum of the divided detection aperture angles θdiv, so the total shift amount N x_Tot with respect to the entire detection aperture angle θTot (partial pupils A and F at both ends) is a total of the image shift amounts of the divided detection aperture angles θdiv. This can be obtained by the following equation:

$$N x\_Tot = N x\_ab + N x\_bc + N x\_cd + N x\_de + N x\_ef \quad (4).$$

A correction amount (constant cst) corresponding to a position of the focus detection surface is added to the calculated total shift amount N x_Tot, and the total shift amount Δn on the focus detection surface is obtained.

$$\Delta n = N x\_Tot + cst \quad (5).$$

The defocus amount calculation portion 66 converts a total shift amount Δn into a defocus amount Df by using a constant Kf depending on the entire detection aperture angle θTot.

$$Df = Kf \, X \, \Delta n \quad (6).$$

Thus, according to this embodiment, based on the signal output from a plurality of light receiving elements of the light receiving element array 51, a plurality of signal strings corresponding to the respective light fluxes which have been transmitted through at least three partial pupils (A-F) of the shooting lens 23 are generated. The shift amount of two signal strings within these signal strings is calculated, and based on the shift amount formed of these shift amounts, a defocus amount of the shooting lens 23 is detected. Thus, by eliminating a false focus with respect to an object having a cyclic pattern, an accurate defocus amount can be detected. In addition, a total shift amount is obtained by adding a plurality of shift amounts based on three signal strings or more corresponding to the light fluxes which have been transmitted through three partial pupils or more, so irregularity of the defocus amount decreases due to a statistical effect, and detection accuracy can be improved.

A modified example now will be described. In the above-mentioned embodiment, based on the signal output from a plurality of light receiving elements of the light receiving element array 51, a plurality of signal strings corresponding to the respective light rays which have been transmitted through at least three partial pupils (A-F) of the shooting lens 23 are generated, a shift amount of two of the signal strings is calculated, and a defocus amount of the shooting lens 23 is detected based on the total of these shift amounts. However, the defocus amount of the shooting lens 23 also can be detected by summing up (averaging) these defocus amounts, after the respective shift amounts are converted to the defocus amounts by using a conversion coefficient.

For example, if the shift amounts of two signal strings are N x_ab, N x_bc, N x_cd, N x_de, N x_ef, and coefficients by which the shift amounts of the two signal strings are converted to the defocus amount are k ab, k bc, k cd, k de, k ef, the defocus amount D is obtained by the following equation.

$$D = (k \, ab \times N x\_ab + k \, bc \times N x\_bc + k \, cd \times N x\_cd + k \, de \times N x\_de + k \, ef \times N x\_ef)/5 \quad (7).$$

In this case, there are five defocus amounts, so an average defocus amount is obtained by dividing a sum of the five defocus amounts by five. In general, the sum of the defocus amounts is divided by the number of the defocus amounts that were added together. Furthermore, if the shift amounts of the two signal strings are converted to the defocus amount, the defocus amount D also can be obtained by adding weights q ab, q bc, q cd, q de, q ef according to the positions of the light receiving elements which output the respective signal strings.

$$D = (q \, ab \times k \, ab \times N x\_ab + q \, bc \times k \, bc \times N x\_bc + q \, cd \times k \, cd \times N x\_cd + q \, de \times k \, de \times N x\_de + q \, ef \times k \, ef \times N x\_ef) / \{(q \, ab + q \, bc + q \, cd + q \, de + q \, ef) \times 5\} \quad (8).$$

Another modified example will be described. In the above-mentioned embodiment, an example is shown in which the divided detection aperture angles θdiv are equal. However, even when the detection aperture angles θdiv are different from each other, by using an appropriate conversion coefficient for each detection aperture angle θdiv, an accurate defocus amount can be obtained according to the above-mentioned method. In other words, the invention is not limited to the case in which a plurality of light receiving elements of the light receiving elements 51 are arranged at the same pitch, but part of the light receiving elements also can be arranged at a different pitch.

Another modified example will be described. When an actual stop is stopped during shooting, a defocus amount Df is calculated by using only the light rays passing through the stop. For example, according to the example shown in FIG. 4, when partial pupils A and F are shaded by a stop and substantially match the light rays of the portion in which the partial pupils B-E are stopped, a defocus amount Df is obtained by the following equation.

$$Df = (k \, bc \times N x\_bc + k \, cd \times N x\_cd + k \, de \times N x\_de)/3 + k \, cst \quad (9).$$

Here, there are three defocus amounts, so their sum is divided by three to obtain average. The defocus amount obtained by equation (9) is a defocus amount corresponding to the partial pupils B and E, excluding the shaded partial pupils A and F at both ends. By so doing, an accurate defocus amount can be detected without being affected by shading of the focus detection light rays by an aperture stop during shooting.

Another modified example will be described. According to the above-mentioned embodiment, an example is shown in which a signal string is generated by aligning output signals of one light receiving element from each light receiving element array 51. However, a signal string also can be generated in which a plurality of light receiving element outputs of each light receiving element array 51 are added in advance and the calculation result is considered as one light receiving element.

Figure 7:
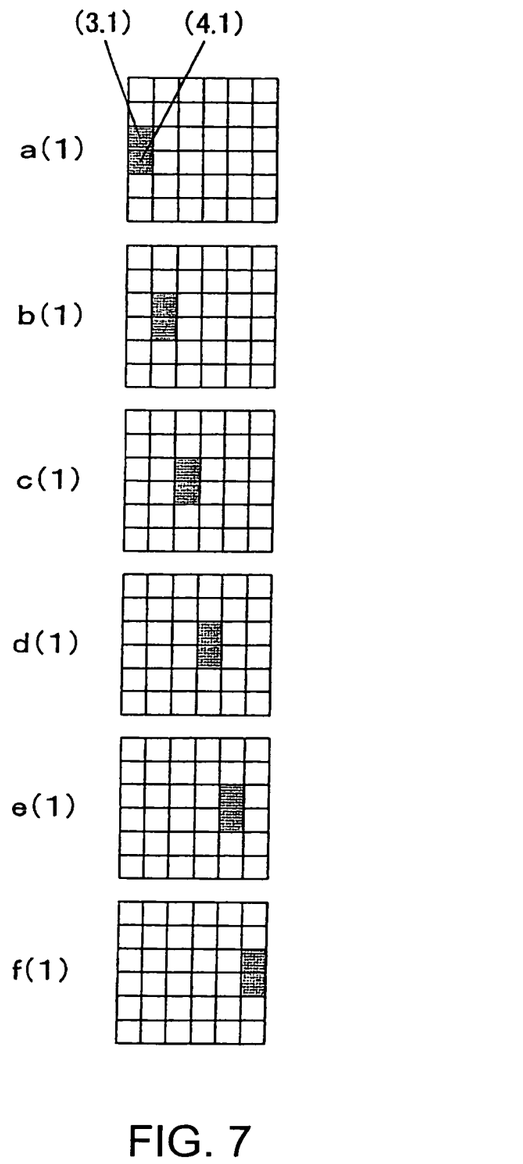
FIG. 7 is a diagram explaining one method of generating signal strings.

For example, if output signals of the light receiving elements of the third and the fourth lines of each light receiving element array 51 are added and output signals a(1), b(1), ..., f(1) of the light receiving element array 51 of the lowest end shown in FIG. 4 are generated, as shown in FIG. 7, output signals of light receiving elements (3.1) and (4.1) are added and considered as an output signal a(1), output signals of light receiving elements (3.2) and (4.2) are added and considered as an output signal b(1), output signals of light receiving elements (3.3) and (4.3) are added and considered as an output signal c(1). Furthermore, output signals of light receiving elements (3.4) and (4.4) are added and considered as an output signal d(1), output signals of light receiving elements (3.5) and (4.5) are added and considered as an output signal e(1), and output signals of light receiving elements (3.6) and (4.6) are added and considered as an output signal f(1). In the same manner, output signals a(2)-f(2), a(3)-f(3), a(4)-f(4), a(5)-f(5), and a(6)-f(6) of another light receiving element array 51 are generated.

Figure 8:
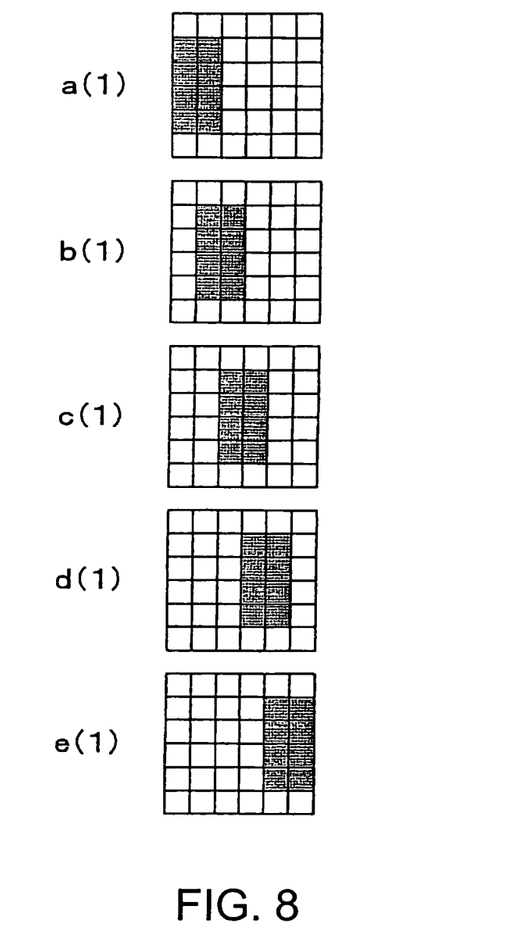
FIG. 8 is a diagram explaining another method of generating signal strings.

Furthermore, when output signals of eight light receiving elements within each light receiving element array 51 are added together, and output signals a(1), b(1), c(1), d(1), e(1) of the light receiving element array 51 of the lowest end shown in FIG. 4 are generated, as shown in FIG. 8, output signals of eight light receiving elements are added together. In this case, the number of light receiving elements to be added is large, so the number of output signals decreases. Furthermore, in the same manner, output signals a(2)-e(2), a(3)-e(3), a(4)-e(4), a(5)-e(5), and a(6)-e(6) of another light receiving element array 51 are generated.

Thus, as a signal string is generated by adding an output signal of at least two light receiving elements within a plurality of light receiving elements of the light receiving element array 51, an effect of noise included in the light receiving element output is minimized, and focus detection accuracy can be improved. Furthermore, if dark locations exist, a signal amount can be increased (because more locations are used), so adverse effects of dark locations can be reduced.

Furthermore, in the above-mentioned embodiment and the modified examples, in order to simplify the explanation, an example of the micro lens array 4 was used in which a plurality of micro lenses 41 are two-dimensionally arranged. However, a micro lens array also can be used in which a plurality of micro lenses are arranged only in positions corresponding to a focus detection area on a shooting screen.

What is claimed is:

1. A focus detection device comprising:
   a micro lens array having a plurality of micro lenses;
   a light receiving element array having three or more light receiving elements that are all substantially a same shape that are aligned in one direction for each of the micro lenses, the three or more light receiving elements receiving via their respective micro lens, light rays from three or more partial areas of a pupil of one or more pupils, wherein each of the one or more pupils of an imaging optical system are different from each other;
   a signal string generator that generates at least three signal strings respectively corresponding to images of the light rays which have been transmitted through each of the three or more partial areas, based on signals outputted from the three or more light receiving elements of the light receiving element array;
   a focus detector that obtains, within the at least three signal strings, shift amounts of two of the signal strings corresponding to two of the three or more partial areas, for a plurality of adjacent pairs of partial areas of the three or more partial areas, and determines a focus adjustment state of the imaging optical system based on the obtained plurality of shift amounts; and
   wherein the plurality of shift amounts include a shift amount between a first signal string corresponding to a first partial area within the three or more partial areas and a second signal string corresponding to a second partial area different from the first partial area, and a shift amount between the first signal string and a third signal string corresponding to a third partial area different from the first partial area and the second partial area.

2. The focus detection device according to claim 1, wherein the signal string generator generates a plurality of signal strings based on light rays that have been transmitted through at least three partial areas included in an area corresponding to an aperture stop of the imaging optical system.

3. The focus detection device according to claim 1, wherein the signal string generator generates the plurality of signal strings by adding outputs of the three or more light receiving elements of the light receiving element array.

4. The focus detection device according to claim 1, wherein the three or more light receiving elements of the light receiving element array are one-dimensionally arranged.

5. The focus detection device according to claim 1, wherein the three or more light receiving elements of the light receiving element array are two-dimensionally arranged.

6. An image pick-up device comprising the focus detection device of claim 1.

7. A focus detection device comprising:
   a micro lens array having a plurality of micro lenses;
   a light receiving element array having three or more light receiving elements that are all substantially a same shape that are aligned in one direction for each of the micro lenses, the three or more light receiving elements receiving via their respective micro lens, light rays from three or more partial areas of a pupil of one or more pupils, wherein each of the one or more pupils of an imaging optical system are different from each other;
   a signal string generator that generates at least three signal strings respectively corresponding to images of the light rays which have been transmitted through each of the three or more partial areas, based on signals outputted from the three or more light receiving elements of the light receiving element array;
   a focus detector that obtains, within the at least three signal strings, shift amounts of two of the signal strings corresponding to two of the three or more partial areas, for a plurality of adjacent pairs of partial areas of the three or more partial areas, and determines a focus adjustment state of the imaging optical system based on the obtained plurality of shift amounts;
   wherein the plurality of shift amounts include a shift amount between a first signal string corresponding to a first partial area within the three or more partial areas and a second signal string corresponding to a second partial area different from the first partial area, and a shift amount between the first signal string and a third signal string corresponding to a third partial area different from the first partial area and the second partial area; and
   wherein the focus detector determines the focus adjustment state by weighted addition of respective ones of the plurality of shift amounts.

8. A focus detection device comprising:
a micro lens array having a plurality of micro lenses;
a light receiving element array having three or more light receiving elements that are all substantially a same shape that are aligned in one direction for each of the micro lenses, the three or more light receiving elements receiving via their respective micro lens, light rays from three or more partial areas of a pupil of one or more pupils, wherein each of the one or more pupils of an imaging optical system are different from each other;
a signal string generator that generates at least three signal strings respectively corresponding to images of the light rays which have been transmitted through each of the three or more partial areas, based on signals outputted from the three or more light receiving elements of the light receiving element array;
a focus detector that obtains, within the at least three signal strings, shift amounts of two of the signal strings corresponding to two of the three or more partial areas, for a plurality of adjacent pairs of partial areas of the three or more partial areas, and determines a focus adjustment state of the imaging optical system based on the obtained plurality of shift amounts;
wherein the plurality of shift amounts include a shift amount between a first signal string corresponding to a first partial area within the three or more partial areas and a second signal string corresponding to a second partial area different from the first partial area, and a shift amount between the first signal string and a third signal string corresponding to a third partial area different from the first partial area and the second partial area and
wherein the focus detector multiplies and adds separate conversion coefficients of the shift amounts for two respective signal strings corresponding to the two partial areas of the three or more partial areas to determine a defocus amount of the imaging optical system.

9. A focus detection device comprising:
a micro lens array having a plurality of micro lenses;
a light receiving element array having three or more light receiving elements that are all substantially a same shape that are aligned in one direction for each of the micro lenses, the three or more light receiving elements receiving via their respective micro lens, light rays from three or more partial areas of a pupil of one or more pupils, wherein each of the one or more pupils of an imaging optical system are different from each other;
a signal string generator that generates at least three signal strings respectively corresponding to images of the light rays which have been transmitted through each of the three or more partial areas, based on signals outputted from the three or more light receiving elements of the light receiving element array;
a focus detector that obtains, within the at least three signal strings, shift amounts of two of the signal strings corresponding to two of the three or more partial areas, for a plurality of adjacent pairs of partial areas of the three or more partial areas, and determines a focus adjustment state of the imaging optical system based on the obtained plurality of shift amounts;
wherein the plurality of shift amounts include a shift amount between a first signal string corresponding to a first partial area within the three or more partial areas and a second signal string corresponding to a second partial area different from the first partial area, and a shift amount between the first signal string and a third signal string corresponding to a third partial area different from the first partial area and the second partial area; and
wherein the conversion coefficients are set according to positions of the three or more light receiving elements of the light receiving element array.

10. A method of determining a focus adjustment state of an imaging optical system, the method comprising:
passing light through a micro lens array having a plurality of micro lenses;
receiving the light having passed through the micro lens array with a light receiving element array having three or more light receiving elements that are all substantially the same shape that are aligned in one direction for each of the micro lenses, the plurality of light receiving elements receiving via their respective micro lens, light rays from three or more partial areas of a pupil of one or more pupils, wherein each of the one or more pupils of the imaging optical system are different from each other;
generating at least three signal strings respectively corresponding to images of the light rays that have been transmitted through at least three of the three or more partial areas, based on signals output from the three or more light receiving elements of the light receiving element array;
obtaining, within the at least three signal strings, shift amounts of two of the signal strings corresponding to two partial areas of the three or more partial areas, for a plurality of adjacent pairs of the three or more partial areas, and determining a focus adjustment state of the imaging optical system based on the obtained plurality of shift amounts; and
wherein the plurality of shift amounts include a shift amount between a first signal string corresponding to a first partial area within the three or more partial areas and a second signal string corresponding to a second partial area different from the first partial area, and a shift amount between the first signal string and a third signal string corresponding to a third partial area different from the first partial area and the second partial area.

11. The method according to claim 10, wherein the focus adjustment state is determined by weighted addition of the respective ones of the plurality of shift amounts.

12. The method according to claim 10, wherein the focus adjustment state is determined by multiplying and adding separate conversion coefficients of the shift amounts for two of the respective signal strings corresponding to the two partial areas of the three or more partial areas to determine a defocus amount of the imaging optical system.

13. The method according to claim 12, wherein the conversion coefficients are set according to positions of the three or more light receiving elements of the light receiving element array.

14. The method according to claim 10, wherein a plurality of signal strings are generated based on light rays that have been transmitted through at least three partial areas of the three or more partial areas included in an area corresponding to an aperture stop of the imaging optical system.

15. The method according to claim 10, wherein the plurality of signal strings are generated by adding outputs of the three or more light receiving elements of the light receiving element array.

16. The method according to claim 10, wherein the three or more light receiving elements of the light receiving element array are one-dimensionally arranged.

17. The method according to claim 10, wherein the three or more light receiving elements of the light receiving element array are two-dimensionally arranged.

* * * * *